3,803,236
PARA - AMINOPROPYL-2-HYDROXY-ETHERS OF PHENYLAMINOTROPONES AND THE SALTS THEREOF

Yasunobu Sato, Yutaka Kobayashi, Teruo Tanaka, Hiromu Takagi, Seiji Kumakura, Takeshi Oshima, and Koichi Nakayama, Tokyo, Japan, assignors to Sankyo Company Limited, Tokyo, Japan
No Drawing. Filed Dec. 13, 1971, Ser. No. 207,642
Claims priority, application Japan, Dec. 21, 1970, 45/116,302
Int. Cl. C07c 93/06
U.S. Cl. 260—570.7     7 Claims

ABSTRACT OF THE DISCLOSURE

A phenylaminotropone derivative having the formula

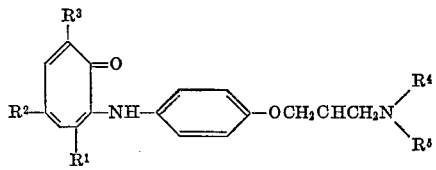

wherein $R^1$, $R^2$ and $R^3$ may be the same or different and each represents hydrogen atom, a lower alkyl group, a halogen atom, an acylamino group or amino group, $R^4$ represents hydrogen atom or a lower alkyl group and $R^5$ represents a lower alkyl group or a cycloalkyl group or $R^4$ and $R^5$ represent, together with the nitrogen atom to which they are attached and with up to one of N, S and O atom, a ring system of up to 10 carbon atoms and the pharmaceutically acceptable acid addition salt thereof.

The compound is useful as β-adrenergic blocking, hypotensive and coronary vasodilating agents and may be prepared by reacting a compound having the formula

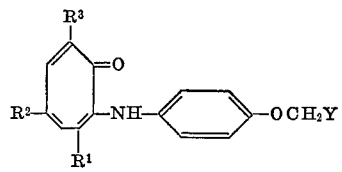

wherein $R^1$, $R^2$ and $R^3$ are the same as above and Y represents the formula

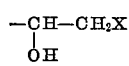

wherein X represents a halogen atom, or 2-oxiranyl group with an amine having the formula

wherein $R^4$ and $R^5$ are the same as above in the presence or absence of an inert organic solvent.

This invention relates to novel phenylaminotropone derivatives and a novel process for the preparation thereof.

More particularly, this invention relates to novel phenylaminotropone derivatives having the formula

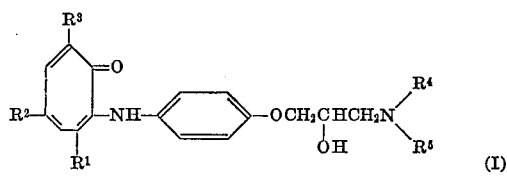

wherein $R^1$, $R^2$ and $R^3$ may be the same or different and each represents a hydrogen atom, a lower alkyl group, a halogen atom, an acylamino group or an amino group, $R^4$ represents a hydrogen atom or a lower alkyl group and $R^5$ represents a lower alkyl group or a cycloalkyl group or $R^4$ and $R^5$ represent, together with the nitrogen atom to which they are attached and with up to one of N, S and O atoms, a ring system of up to 10 carbon atoms.

The term "lower alkyl" is intended to represent a straight or branched alkyl group of from 1 to 5 carbon atoms such as methyl, ethyl, n-propyl, isopropyl, n-butyl, sec-butyl and tert-butyl. The term "cycloalkyl" is intended to represent a cycloalkyl group of from 3 to 10 carbon atoms such as cyclopropyl, cyclobutyl, cyclopentyl, cyclohexyl, cycloheptyl and cyclooctyl. The halogen atom may be fluorine, chlorine, bromine or iodine.

The acylamino group may be an aliphatic- or aromatic acylamino group such as acetylamino, propionylamino, benzoylamino and toluylamino.

The ring system formed by $R^4$ and $R^5$ may be pyrrolidino, piperidino, piperazino, N'-methylpiperazino, N'-benzylpiperazino, morpholino and thiamorpholino.

This invention also relates to the pharmaceutically acceptable acid addition salts of the phenylaminotropone derivative having the Formula I, particularly the hydrochloride, hydrobromide, sulfate, nitrate, maleate, citrate, acetate and benzoate.

This invention further relates to a process for the preparation of the phenylaminotropone derivatives having the Formula I.

All of the Compounds I prepared by the present invention are novel and exhibit β-adrenergic blocking, hypotensive and coronary vasodilating effects.

Therefore, it is an object of this invention to provide novel phenylaminotropone derivatives having the Formula I and the acid addition salts thereof which are useful as β-adrenergic blocking, hypotensive and coronary vasodilating agents.

Another object of this invention is to provide a novel process for preparing the phenylaminotropone derivatives having the Formula I. In the present invention, the phenylaminotropone derivatives represented by the above Formula I are intended to include all of optical isomers which can exist.

The phenylaminotropone derivatives (I) may be administered orally or parenterally. The pharmaceutical preparation of the Compounds I may be in the form of oral preparations including tablets, capsules, powders, suspensions and syrups or injectable preparations including solutions and suspensions. The total daily dosage for adults is usually about 1–200 mg. in divided doses in case of oral administration.

According to the present invention, the phenylaminotropone derivatives (I) can be prepared by reacting a compound having the formula

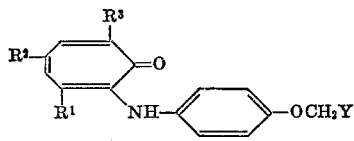

(II)

wherein $R^1$, $R^2$ and $R^3$ are the same as above and Y represents the formula

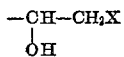

wherein X represents a halogen atom such as chlorine, bromine, iodine and fluorine, or 2-oxiranyl group with an amine having the formula

(III)

wherein $R^4$ and $R^5$ are the same as above in the presence or absence of an inert organic solvent.

The reaction of the present invention may be carried out by contacting the Compound II with the Compound III. It is desirable to carry out the reaction under heating in the presence of an inert organic solvent in order to conduct the reaction smoothly. As the solvent, there may be employed any organic solvent without limitation that would not affect the reaction. Examples of such a solvent include lower alkanols such as methanol, ethanol, propanol, isopropanol and butanol, ethers such as tetrahydrofuran and dioxane, aromatic hydrocarbons such as benzene and toluene, halogenated hydrocarbons such as dichloromethane and tetrachloroethane and dimethylformamide.

The reaction temperature is not critical and the reaction is preferably carried out at a range of temperature between room temperature and 100° C. or reflux temperature of the solvent employed, but it proceeds at an upper or lower temperature. The reaction period may be varied mainly depending upon the reaction temperature and the kind of the reactant and the solvent employed.

Usually it is from several hours to one hundred hours. After completion of the reaction, the desired product may be recovered from the reaction mixture by a conventional means. For instance, the reaction product may be recovered by removal of the reaction solvent through evaporation and may be purified by recrystallization of the residue when it is a crystalline substance or by chromatography of the residue when it is an oily substance. The oily residue may be also purified by reacting said residue with an acid in a conventional manner to give a crystalline and pharmaceutically acceptable non-toxic acid addition salt such as a hydrochloride, sulfate or citrate and recrystallizing the salt thus obtained.

The compounds II employed as a starting material in this invention are novel and prepared by reacting a tropone derivative having the formula

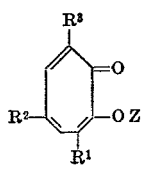

(IV)

wherein $R^1$, $R^2$ and $R^3$ are the same as above and Z represents a straight or branched lower alkyl group such as methyl, ethyl, propyl and isopropyl or a sulfonyl group such as methanesulfonyl, benzenesulfonyl and p-toluenesulfonyl with p-aminophenol to give a p-hydroxyphenylaminotropone derivative having the formula

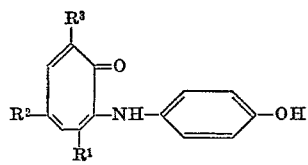

(V)

wherein $R^1$, $R^2$ and $R^3$ are the same as above and reacting the latter compound with an epihalogenohydrin in the presence of a base or by reacting the epoxy compound thus obtained with a hydrogen halide.

The process for preparation of the Compounds II is concretely shown below.

PREPARATION OF THE STARTING MATERIALS (1) 2-[p-(2,3-epoxypropoxy)phenylamino]tropone A mixture of 50 g. of tropone tosylate, 21.6 g. of p-aminophenol and 400 ml. of ethanol is heated under reflux for 26 hours. The reaction mixture is concentrated under reduced pressure. The precipitates formed are separated by filtration and washed with acetone and recrystallized from a mixture of ethyl acetate and ethanol to give 40 g. of 2-(p-hydroxyphenylamino)tropone p-toluenesulfonate melting at 227–228° C. as a pure product. The crystals obtained are chromatographed on silica gel in column and the eluates with chloroform are collected.

The solvent is distilled off and the residue is recrystallized from an aqueous ethanol to give 2-(p-hydroxyphenylamino)tropone melting at 183–184° C. as a pure product. 12.5 g. of 2-(p-hydroxyphenylamino)tropone is dissolved in 120 ml. of methyl ethyl ketone and to the solution are added 24 g. of potassium carbonate and 13.7 g. of epibromohydrin.

The mixture is heated under reflux with stirring for 9 hours. After completion of the reaction, the insolubles are filtered off from the reaction mixture and the filtrate is concentrated under reduced pressure. To the residue is added water and the oils separated out in situ are extracted with chloroform.

The extract is concentrated under reduced pressure and the residue is chromatographed on alumina in column to give 13.4 g. of 2-[p-(2,3-epoxypropoxy)phenylamino] tropone as a pure product.

(2) 2-[p-(2-hydroxy-3-chloropropoxy)phenylamino] tropone 4.6 g. of 2-[p-(2,3-epoxypropoxy)phenylamino]tropone is dissolved in 100 ml. of methyl ethyl ketone and hydrogen chloride gas is passed into the solution under ice cooling. The solution is allowed to stand for several hours and poured into water. The oils separated out in situ are extracted with chloroform and the extract is concentrated under reduced pressure. The residue is recrystallized from ethanol to give 2 g. of 2-[p-(2-hydroxy-3- chloropropoxy)phenylamino]tropone melting at 140–141° C. as a pure product.

(3) 2-[p-(2,3-epoxypropoxy)phenylamino]-5-chlorotropone

A mixture of 12.1 g. of 5-chloro-2-methoxytropone, 8.5 g. of p-aminophenol and 200 ml. of ethanol is heated under reflux for 20 hours. The precipitates formed are separated by filtration and recrystallized from ethanol to give 11 g. of 2-(p-hydroxyphenylamino)-5-chlorotropone melting at 203–204° C. as a pure product. 14.1 g. of the crystals obtained are dissolved in 200 ml. of methyl ethyl ketone and to the solution are added 24 g. of potassium carbonate and 23.5 g. of epibromohydrin. The mixture is heated under reflux with stirring for 10.5 hours. After completion of the reaction, insolubles are filtered off from the reaction mixture and the filtrate is concentrated under reduced pressure. The residue is extracted with chloroform and the solvent is distilled off under reduced pressure. The residue is purified with alumina column chromatography and with recrystallization from benzene to give 15 g. of 2-[p-(2,3-epoxypropoxy)phenylamino]-5-chlorotropone melting at 138–139° C. as a pure product.

(4) 2-[p-(2,3-epoxypropoxy)phenylamino]-5-bromotropone

A mixture of 9.65 g. of 5-bromo-2-methoxytropone, 5.4 g. of p-aminophenol and 150 ml. of ethanol is heated under reflux for 16.5 hours. After cooling, the precipitates formed are separated by filtration and recrystallized from methanol to give 7 g. of 2-(p-hydroxyphenylamino)-5-bromotropone melting at 215–217° C. as a pure product. 7 g. of the crystals thus obtained is dissolved in 100 ml. of methyl ethyl ketone and to the solution are added 11.2 g. of potassium carbonate and 11.1 g. of epibromohydrin. The mixture is heated under reflux with stirring for 18 hours. After completion of the reaction, the solvent is distilled off from the reaction mixture under reduced pressure and to the residue is added water. The oil separated out are extracted with chloroform. The solvent is distilled off from the extract under reduced pressure and the residue is recrystallized from methyl acetate to give 6 g. of 2-[p-(2,3 - epoxypropoxy)phenylamino]5-bromotropone melting at 145–146° C. as a pure product.

(5) 2-[p-(2,3-epoxypropoxy)phenylamino]-5-acetylaminotropone

A mixture of 50 g. of 5-acetylamino-2-methoxytropone, 22.3 g. of p-aminophenol and 600 ml. of ethanol is heated under reflux with stirring for 35 hours and concentrated under reduced pressure. The precipitates formed are recrystallized from ethanol to give 41 g. of 2-(p-hydroxyphenylamino)-5- acetylaminotropone melting at 227–229° C. as a pure product. 2.7 g. of the crystals obtained is dissolved in 50 ml. of methyl ethyl ketone and to the solution is added 4.1 g. of potassium carbonate and 4.1 g. of epibromohydrin. The mixture is heated under reflux with stirring for 7 hours. After completion of the reaction, insolubles are filtered off and the filtrate is concentrated under reduced pressure. The residue is recrystallized from ethyl acetate to give 2-[p-(2,3-epoxypropoxy)phenylamino] - 5-acetylaminotropone melting at 125–126° C. as a pure product.

(6) 2-[p-(2,3-epoxypropoxy)phenylamino]-5-methyltropone

A mixture of 15.1 g. of 2-methoxy-5-methyltropone, 24 g. of p-aminophenol and 200 ml. of ethanol is heated under reflux for 16.5 hours. After cooling, water is added to the reaction mixture and the precipitates formed are separated by filtration and recrystallized from aqueous ethanol to give 15.7 g. of 2-(p-hydroxyphenylamino)-5-methyltropone melting at 188–189° C. as a pure product. 4.6 g. of the crystals obtained is dissolved in 50 ml. of methyl ethyl ketone and to the solution is added 8.3 g. of potassium carbonate and 8.2 g. of epibromohydrin. The mixture is heated under reflux with stirring for 8 hours. After completion of the reaction, insolubles are filtered off from the reaction mixture and the filtrate is concentrated under reduced pressure. The residue is chromatographed on alumina in column and recrystallized from a mixture of benzene and n-hexane to give 6 g. of 2-[p - (2,3 - epoxypropoxy)phenylamino]-5-methyltropone melting at 89–90° C.

(7) 2-[p-(2,3-epoxypropoxy)phenylamino]-3,5,7-trimethyltropone

A mixture of 5.2 g. of 2-methoxy-3,5,7-trimethyltropone, 3.2 g. of p-aminophenol and 100 ml. of ethanol is heated under reflux for 17 hours and concentrated under reduced pressure. The residue is recrystallized from ethanol to give 2.5 g. of 2-(p-hydroxyphenylamino)-3,5,7-trimethyltropone melting at 179–180° C. as a pure product. 2.5 g. of the crystals obtained is dissolved in 40 ml. of methyl ethyl ketone and to the solution is added 4 g. of potassium carbonate and 4 g. of epibromohydrin. The mixture is heated under reflux with stirring for 11.5 hours. After completion of the reaction, insolubles are filtered off from the reaction mixture and the filtrate is concentrated under reduced pressure. The residue is chromatographed on alumina in column to give 3.4 g. of 2-[p-(2,3-epoxypropoxy)phenylamino] 3,5,7 - trimethyltropone as a pure product.

The following experimental data will evidently show that the phenylaminotropone derivatives having the Formula I exhibit very potent β-adrenergic blocking, hypotensive and coronary vasodilating effects and have low toxicities.

(1) β-Adrenergic blocking activity

Isolated right atrial muscle of guinea pig including sino-atrial node was placed in a 40 ml. organ bath filled with Tyrode solution at 38° C. The solution was bubbled with a mixture of 95% oxygen and 5% carbon dioxide. Contractile force and contraction rate were simultaneously recorded with an ink-writing oscillograph. The β-adrenergic blocking activities of the phenylaminotropone derivatives (I) and Isoptin i.e., 5-[N-(3,4-dimethoxyphenethyl)methylamino] - 2 - (3,4-dimethoxyphenyl)-2-isopropylvaleronitrile were estimated by inhibition of positive inotropic and chronotropic responses induced by isoproterenol, i.e., α-(isopropylaminomethyl)protocatechuyl alcohol in the concentration of $10^{-8}$ g./ml. The result is shown in Table 1.

(2) Coronary vasodilating activity

A right coronary artery of a canine heart in vivo was perfused with arterial blood from the femoral artery at a constant pressure of 100 mm. Hg. The phenylaminotropone derivatives (I) and Isoptin were directly administered to the right coronary artery at doses of 30–100 μg. and flow responses were observed by an electromagnetic flow meter. Coronary vasodilating activities of the tested compounds were expressed as relative potencies to 10μg. of nitroglycerine (vasodilating activity of 10μg. of nitroglycerine, as measured by area under the flow tracing, was taken as unit).

The result is shown in Table 1.

TABLE I
[β-Adrenergic blocking and coronary vasodilating activities of the phenylaminotropone derivatives (I)]

| Compounds | Concentration (g./ml.) | β-Adrenergic blocking activity (percent inhibition) | | Coronary vasodilating activity (relative potency) | | |
|---|---|---|---|---|---|---|
| | | Inhibition of contractive | Inhibition of contraction rate | Dose (γ) | Relative potency | Duration period (minutes) |
| 2-[p-(2-hydroxy-3-isopropylaminopropoxy)phenylamino]tropone (Ex. 1) | $10^{-6}$ / $10^{-5}$ | 58 / 98 | 73 / 94 | 100 | 1.5 | 2 |
| 2-[p-(2-hydroxy-3-tert-butylaminopropoxy)phenylamino]tropone (Ex. 2) | $10^{-6}$ | 14 | 57 | 100 | 2.3 | 3 |
| 2-[p-(2-hydroxy-3-isopropylaminopropoxy)phenylamino]-5-chlorotropone (Ex. 3) | $10^{-7}$ / $10^{-6}$ | 19 / 79 | 36 / 82 | 30 / 100 | 1.6 / 9.9 | 3.7 / 10 |
| 2-[p-(2-hydroxy-3-tert-butylaminopropoxy)phenylamino]-5-chlorotropone (Ex. 4) | $10^{-7}$ / $10^{-6}$ | 26 / 75 | 33 / 70 | 30 / 100 | 4.2 / 8.7 | 7 / 10 |
| 2-[p-(2-hydroxy-3-isopropylaminopropoxy)phenylamino]-5-bromotropone (Ex. 5) | $10^{-6}$ | 60 | 56 | 100 | 2.5 | 3 |
| 2-[p-(2-hydroxy-3-tert-butylaminopropoxy)phenylamino]-5-bromotropone (Ex. 6) | $10^{-7}$ / $10^{-5}$ | 47 / 83 | 62 / 88 | 30 / 100 | 2.7 / 9.4 | 5.5 / 10 |
| 2-[p-(2-hydroxy-3-isopropylaminopropoxy)phenylamino]-5-acetylaminotropone (Ex. 7) | $10^{-5}$ | 21 | 22 | 100 | 0 | 0 |
| 2-[p-(2-hydroxy-3-tert-butylaminopropoxy)phenylamino]-5-aminotropone (Ex. 8) | $10^{-5}$ | 43 | 25 | 100 | 0 | 0 |
| 2-[p-(2-hydroxy-3-isopropylaminopropoxy)phenylamino]-5-methyltropone (Ex. 9) | $10^{-7}$ / $10^{-5}$ | 30 / 50 | 22 / 63 | 100 | 2 | 2 |
| 2-[p-(2-hydroxy-3-tert-butylaminopropoxy)phenylamino]-5-methyltropone (Ex. 10) | $10^{-5}$ | 10 | 47 | 100 | 1.5 | 1.5 |
| 2-[p-(2-hydroxy-3-isopropylaminopropoxy)phenylamino]-3,5,7-trimethyltropone (Ex. 11) | $10^{-7}$ / $10^{-6}$ | 55 / 72 | 44 / 69 | 100 | 2 | 1.5 |
| 2-[p-(2-hydroxy-3-tert-butylaminopropoxy)phenylamino]-3,4,7-trimethyltropone (Ex. 12) | $10^{-7}$ / $10^{-5}$ | 0 / 77 | 27 / 71 | 100 | 2 | 2 |
| 2-[p-(2-hydroxy-3-cyclohexylaminopropoxy)phenylamino]-5-chlorotropone (Ex. 14) | $10^{-5}$ | 27 | 27 | 30 / 100 | 8.7 / 9 | 13 / 10 |
| 2-[p-(2-hydroxy-3-cyclohexylaminopropoxy)phenylamino]tropone (Ex. 15) | $10^{-6}$ / $10^{-5}$ | 9 / 25 | 27 / 40 | 100 / 30 | 2.5 / 14 | 5 / 16.5 |
| Isoptin | $10^{-5}$ | — | Stop | 100 | 9.7 | |

(3) Hypotensive effect in spontaneously hypertensive rat

Method.—Blood pressure was measured by the tail-plethsmographic method. Animals used were male and female spontaneously hypertensive rats, higher than 180 mm. Hg in blood pressure levels, 2 or 4 animals per a dose, weighing 200 to 300 g. Blood pressure were measured 2, 4 and 6 hours after oral administration of test compounds. From the time-response curve, the area under the curve was calculated and termed as "hypotensive index." Hypotensive index were compared among standard and test compounds.

(4) Acute toxicity

Method.—Acute toxicity was determined by oral route in mice. Animals used were male mice of the ddY-strain, weighing 20 to 25 g., 3 or 5 animals per a dose. Death rate was registered after 1 week observation. $LD_{50}$ was calculated by the method of Litchfield and Wilcoxon (J. Pharmacol., 96, 99, 1949).

Results.—Hypotensive activity and acute toxicity are shown in Table II. These results show that phenylaminotropon derivatives (I) possessed more potent hypotensive effective effects and less acute toxicity than those of mecamylamine-HCl or tolazoline-HCl.

TABLE II
[Hypotensive action on phenylaminotropone derivatives (I)]

| Compounds | Dose (mg./kg., PO) | Hypotensive index (hr.×mm. Hg) | Evaluation | Toxicity in mice $LD_{50}$ (mg./kg., PO) |
|---|---|---|---|---|
| 2-[p-(2-hydroxy-3-tert-butylaminopropoxy)phenylamino]-5-chlorotropone (Ex. 4) | 10 / 30 | 110 / 300 | ++ / ++ | 647 |
| 2-[p-(2-hydroxy-3-tert-butylaminopropoxy)phenylamino]-5-bromotropone (Ex. 6) | 30 | 215 | ++ | >500 |
| 2-[p-(2-hydroxy-3-isopropylaminopropoxy)phenylamino]-5-chlorotropone (Ex. 3) | 10 / 30 | 200 / 205 | ++ / ++ | 1,024 |
| 2-[p-(2-hydroxy-3-tert-butylaminopropoxy)phenylamino)-5-methyltropone (Ex. 10) | 30 | 130 | ++ | 500=2/3 |
| 2-[p-(2-hydroxy-3-isopropylaminopropoxy)phenylamino]-5-bromotropone (Ex. 5) | 30 | 135 | ++ | >500 |
| 2-[p-(2-hydroxy-3-cycloheptylaminopropoxy)phenylamino-5-chlorotropone (Ex. 17) | 30 | 260 | ++ | >500 |
| 2-[p-(2-hydroxy-3-cyclohexylaminopropoxy)phenylamino]-5-chlorotropone | 10 / 30 | 158 / 205 | ++ / ++ | 823 |
| 2-[p-(2-hydroxy-3-cyclohexylaminopropoxy)phenylamino]-5-bromotropone | 30 | 155 | ++ | >500 |
| 2-[p-(2-hydroxy-3-cyclohexylaminopropoxy)phenylamino]-5-methyltropone | 30 | 95 | + | >500 |
| 2-[p-(2-hydroxy-3-cyclohexylaminopropoxy)phenylamino]-5-chlorotropone (Ex. 13) | 30 | 135 | ++ | — |
| 2-[p-(2-hydroxy-3-morpholinopropoxy)phenylamino]-5-chlorotropone | 30 | 135 | ++ | >500 |
| 2-[p-(2-hydroxy-3-piperidinopropoxy)phenylamino]-5-chlorotropone | 30 | 125 | ++ | 500=2/3 |
| Mecamylamine HCl (N,2,3,3-tetramethyl-2-norcomphanamine) | 30 | 110 | ++ | 140 |
| Tolazolene·HCl(2-benzyl-2-imidazoline) | 20 | 167 | ++ | 300-400 |

Note.—Evaluation, hypotensive index:

Less than 30: —
30–49: ±
50–99: +
More than 100: ++

The following examples are presented to illustrate the process of this invention more concretely.

EXAMPLE 1

2-[p-(2-hydroxy-3-isopropylaminopropoxy)phenylamino]tropone 13.4 g. of 2-[p-(2,3-epoxypropoxy)phenylamino]tropone is dissolved in 25 ml. of isopropyl alcohol and to the resulting solution is added 14 g. of isopropylamine. The mixture is stirred at room temperature for 7 hours. After completion of the reaction, the precipitates produced are recovered by filtration and recrystallized from benzene to give 7.2 g. of the pure desired product melting at 135.5–136.5° C.

*Analysis.*—Calculated for $C_{19}H_{24}N_2O_3$ (percent): C, 69.49; H, 7.37; N, 8.53. Found (percent): C, 69.12; H, 7.38; N, 8.49.

EXAMPLE 2

2-[p-(2-hydroxy-3-tert-butylaminopropoxy)phenylamino]tropone 3 g. of 2 - [p - (2-hydroxy-3-chloropropoxy)phenylamino]tropone is dissolved in 20 ml. of isopropyl alcohol and to the resulting solution is added 7 g. of tert-butylamine. The mixture is heated under reflux with stirring for 35 hours. After completion of the reaction, the reaction mixture is concentrated under reduced pressure and to the residue is added an aqueous potassium carbonate solution. The mixture is extracted with chloroform and the solvent is distilled off. The residue is purified by alumina column chromatography and by recrystallization from ethyl acetate to give 3 g. of the pure desired product melting at 135–136° C.

*Analysis.*—Calculated for $C_{20}H_{26}N_2O_3$ (percent): C, 70.15; H, 7.65; N, 8.18. Found (percent): C, 69.94; H, 7.48; N, 8.30.

EXAMPLE 3

2-[p-(2-hydroxy-3-isopropylaminopropoxy)phenylamino]5-chlorotropone 3 g. of 2-[p-(2,3-epoxypropoxy)phenylamino]-5-chlorotropone is suspended into 70 ml. of dioxane and to the resulting suspension is added 6 ml. of isopropylamine. The mixture is heated at 100° C. in a sealed tube for 16 hours. After completion of the reaction, the reaction mixture is concentrated under reduced pressure and the residue is purified by alumina column chromatography and by recrystallization from a mixture of ethyl acetate and n-hexane to give 2 g. of the pure desired product melting at 93–95° C.

*Analysis.*—Calculated for $C_{19}H_{23}N_2O_3Cl$ (percent): C, 62.89; H, 6.39; N, 7.72; Cl, 9.77. Found (percent): C, 62.76; H, 6.32; N, 5.57; Cl, 9.51.

EXAMPLE 4

2-[p-(2-hydroxy-3-tert-butylaminopropoxy)phenylamino]-5-chlorotropone 2 g. of 2-[p-(2,3-epoxypropoxy)phenylamino]-5-chlorotropone is suspended into 70 ml. of isopropyl alcohol and to the resulting suspension is added 3 g. of tert-butylamine. The mixture is heated at 100° C. in a sealed tube for 9 hours. After completion of the reaction, the reaction mixture is concentrated under reduced pressure and the residue is recrystallized from a mixture of ethyl acetate and n-hexane to give 0.8 g. of the pure desired product melting at 132–133° C.

*Analysis.*—Calculated for $C_{20}H_{25}N_2O_3Cl$ (percent): C, 63.73; H, 6.69; N, 7.43; Cl, 9.41. Found (percent): C, 63.55; H, 6.60; N, 7.38; Cl, 9.13.

EXAMPLE 5

2-[p-(2-hydroxy-3-isopropylaminopropoxy)phenylamino]-5-bromotropone 2 g. of 2-[p-(2,3-epoxypropoxy)phenylamino]-5-bromotropone is suspended into 70 ml. of ethanol and to the resulting suspension is added 6 g. of isopropylamine. The mixture is heated at 100° C. in a sealed tube for 70 hours. After completion of the reaction, the reaction mixture is treated with the same procedure as in Example 3 to give 0.9 g. of the pure desired product melting at 131–133° C.

*Analysis.*—Calculated for $C_{19}H_{23}N_2O_3Br$ (percent): C, 56.02; H, 5.69; N, 6.88; Br, 19.62. Found (percent): C, 56.22; H, 5.80; N, 6.64; Br, 19.12.

EXAMPLE 6

2-[p-(2-hydroxy-3-tert-butylaminopropoxy)phenylamino]-5-bromotropone 2 g of 2-[p-(2,3-epoxypropoxy)phenylamino]-5-bromotropone is suspended into 70 ml. of isopropyl alcohol and to the resulting suspension is added 3 g. of tert-butylamine. The mixture is heated at 100° C. in a sealed tube for 36 hours. After completion of the reaction, the reaction mixture is treated with the same procedure as in Example 4 to give 1 g. of the pure desired product melting at 127.5–128° C.

*Analysis.*—Calculated for $C_{20}H_{25}N_2O_3Br$ (percent): C, 57.01; H, 5.98; N, 6.65; Br, 18.97. Found (percent): C, 57.04; H, 6.09; N, 7.04; Br, 18.86.

EXAMPLE 7

2-[p-(2-hydroxy-3-isopropylaminopropoxy)phenylamino]-5-acetylaminotropone dihydrochloride 3 g. of 2-[p-(2,3-epoxypropoxy)phenylamino]-5-acetylaminotropone is suspended into 120 ml. of isopropyl alcohol and to the resulting suspension is added 9 g. of isopropylamine. The mixture is heated under reflux with stirring for 8 hours. After completion of the reaction, the reaction mixture is concentrated under reduced pressure and the residue is dissolved in ethanol. Hydrogen chloride gas is passed into the solution and the solvent is distilled off. The residue is recrystallized from a mixture of ethylacetate and ethanol to give 1 g. of the pure desired product melting at 146–149° C. (with decomposition).

*Analysis.*—Calculated for $C_{21}H_{29}N_3O_4Cl_2$: (percent): C, 55.02; H, 6.38; N, 9.17; Cl, 15.47. Found (percent): C, 55.41; H, 6.60; N, 8.87; Cl, 14.86.

EXAMPLE 8

2-[p-(2-hydroxy-3-tert-butylaminopropoxy)phenylamino]-5-aminotropone dihydrochloride 3 g of 2-[p-(2,3-epoxypropoxy)phenylamino]-5-aminotropone is ususpended into 150 ml. of isopropyl alcohol and to the resulting suspension is added 9 g. of tert-butylamine. The mixture is heated under reflux with stirring for 5 hours. After completion of the reaction, the reaction mixture is concentrated under reduced pressure. The residue is dissolved in ethanol and the solution is saturated with hydrogen chloride gas. The solvent is distilled off and the crystals obtained are recrystallized from a mixture of ethyl acetate and ethanol to give 2.3 g. of the pure desired product melting at 257.5–260° C. (with decomposition).

*Analysis.*—Calculated for $C_{20}H_{29}N_3O_3Cl_2$ (percent): C, 55.81; H, 6.79; N, 9.76; Cl, 16.48. Found (percent): C, 55.37; H, 6.84; N, 9.64; Cl, 16.05.

EXAMPLE 9

2-[p-(2-hydroxy-3-isopropylaminopropoxy)phenylamino]-5-methyltropone 2.8 g. of 2-[p-(2,3-epoxypropoxy)phenylamino]-5-methyltropone is dissolved in 10 ml. of isopropyl alcohol and to the solution is added 6 g. of isopropylamine. The mixture is stirred at room temperature for 16 hours. After completion of the reaction, the reaction mixture is treated with the same procedure as in Example 4 to give 1 g. of the pure desired product melting at 104–105° C.

*Analysis.*—Calculated for $C_{20}H_{26}O_2N_3$ (percent): C, 70.15; H, 7.65; N, 8.18. Found (percent): C, 70.07; H, 7.68; N, 8.25.

EXAMPLE 10

2-[p-(2-hydroxy-3-tert-butylaminopropoxy)phenyl-amino]-5-methyltropone

3 g. of 2-[p-(2,3-epoxypropoxy)phenylamino]-5-methyltropone is dissolved in 13 ml. of isopropyl alcohol and to the resulting solution is added 6 g. of tert-butylamine. The mixture is stirred at room temperature for 9 hours. After completion of the reaction, the reaction mixture is treated with the same procedure as in Example 4 to give 1 g. of the pure desired product melting at 109.5–111° C.

*Analysis.*—Calculated for $C_{21}H_{28}N_2O_3$ (percent): C, 70.76; H, 7.92; N, 7.86. Found (percent): C, 70.60; H, 7.77; N, 7.84.

EXAMPLE 11

2-[p-(2-hydroxy-3-isopropylaminopropoxy)phenyl-amino]-3,5,7-trimethyltropone

1.8 g. of 2-[p-(2,3-epoxypropoxy)phenylamino]-3,5,7-trimethyltropone is dissolved in 20 ml. of isopropyl alcohol and to the resulting solution is added 3.6 g. of isopropylamine. The mixture is stirred at room temperature for 14 hours. After completion of the reaction, the reaction mixture is treated with the same procedure as in Example 4 to give 0.7 g. of the pure desired product melting at 108–109.5° C.

*Analysis.*—Calculated for $C_{22}H_{30}N_2O_3$ (percent): C, 71.32; H, 8.16; N, 7.56. Found (percent): C, 71.05; H, 8.26; N, 7.34.

EXAMPLE 12

2-[p-(2-hydroxy-3-tert-butylaminopropoxy)phenyl-amino]-3,5,7-trimethyltropone

1.5 g. of 2-[p-(2,3-epoxypropoxy)phenylamino]-3,5,7-trimethyltropone is dissolved in 200 ml. of isopropyl alcohol and to the resulting solution is added 3 g. of tert-butylamine. The mixture is stirred at room temperature for 9 hours. After completion of the reaction, the reaction mixture is treated with the same procedure as in Example 4 to give 1 g. of the pure desired product melting at 95–96° C.

*Analysis.*—Calculated for $C_{23}H_{32}N_2O_3$ (percent): C, 71.84; H, 8.39; N, 7.29. Found (percent): C, 71.85; H, 8.50; N, 7.39.

EXAMPLE 13

2-[p-(2-hydroxy-3-cyclopentylaminopropoxy)phenylamino]-5-chlorotropone

A mixture of 0.85 g. of 2-[p-(2,3-epoxypropoxy)phenylamino]-5-chlorotropone, 1.9 g. of cyclopentylamine and 15 ml. of isopropyl alcohol is heated under reflux with stirring for 46 hours. After completion of the reaction, the reaction mixture is concentrated under reduced pressure. The residue is purified with alumina chromatography and recrystallization from a mixture of benzene and n-hexane to give 0.05 g. of the pure desired product melting at 103–105° C.

*Analysis.*—Calculated for $C_{21}H_{25}N_2O_3Cl$ (percent): C, 64.85; H, 6.48; N, 7.20; Cl, 9.12. Found (percent): C, 64.82; H, 6.47; N, 7.12; Cl, 9.16.

EXAMPLE 14

2-[p-(2-hydroxy-3-cyclohexylaminopropoxy)phenylamino]-5-chlorotropone

A mixture of 3 g. of 2-[p-(2,3-epoxypropoxy)phenylamino]-5-chlorotropone, 8 g. of cyclohexylamine and 70 ml. of isopropyl alcohol is heated under reflux with stirring for 40 hours. The reaction mixture is treated with the same procedure as in Example 13 and the crude product is recrystallized from benzene to give 1.7 g. of the pure desired product melting at 120–122° C.

*Analysis.*—Calculated for $C_{22}H_{27}O_3N_2Cl$ (percent): C, 65.58; H, 6.75; N, 6.95; Cl, 8.80. Found (percent): C, 65.26; H, 6.77; N, 6.86; Cl, 8.33.

Following the same procedure as in Example 14, but replacing 2-[p-(2,3-epoxypropoxy)phenylamino]-5-chlorotropone with 2-[p-(2,3-epoxypropoxy)phenylamino]-5-bromotropone and 2-[p-(2,3-epoxypropoxy)phenylamino]-5-methyltropone, there are obtained 2-[p-(2-hydroxy-3-cyclohexylaminopropoxy)phenylamino]-5-bromotropone (M.P. 122–124° C.) and 2-[p-(2-hydroxy-3-cyclohexylaminopropoxy)phenylamino]-5-methyltropone (M.P. 100–102° C.), respectively.

EXAMPLE 15

2-[p-(2-hydroxy-3-cyclohexylaminopropoxy)phenylamino]tropone

A mixture of 6.4 g. of 2-[p-(2,3-epoxypropoxy)phenylamino]tropone, 15 ml. of isopropyl alcohol and 7 g. of cyclohexylamine is stirred at room temperature for 16 hours. The reaction mixture is treated with the same procedure as in Example 13. The crude product is recrystallized from ethyl acetate to give 3.3 g. of the pure desired product melting at 111–112° C.

*Analysis.*—Calculated for $C_{22}H_{28}O_3N_2$ (percent): C, 71.71; H, 7.66; N, 7.60. Found (percent): C, 71.58; H, 7.68; N, 7.84.

EXAMPLE 16

2-[p-(2-hydroxy-3-cycloheptylaminopropoxy)phenylamino]tropone dihydrochloride

A mixture of 6 g. of 2-[p-(2-hydroxy-3-chloropropoxy)phenylamino]tropone, 8 g. of heptylamine and 15 ml. of isopropyl alcohol is heated under reflux with stirring for 40 hours. After completion of the reaction, the reaction mixture is concentrated under reduced pressure and to the residue is added aqueous potassium carbonate. The mixture is extracted with chloroform and the solvent is distilled off. The residue is purified by alumina chromatography. The oils obtained are converted to hydrochloride by a conventional means. The salt is purified by recrystallization from isopropyl alcohol to give 5 g. of the pure desired product melting at 252° C. (with decomposition).

*Analysis.*—Calculated for $C_{23}H_{32}O_3N_2Cl_2$ (percent): C, 60.65; H, 7.08; N, 6.15; Cl, 15.57. Found (percent): C, 60.77; H, 7.18; N, 6.13; Cl, 15.49.

EXAMPLE 17

2-[p-(2-hydroxy-3-cycloheptylaminopropoxy)phenylamino]-5-chlorotropone

A mixture of 0.5 g. of 2-[p-(2,3-epoxypropoxy)phenylamino]-5-chlorotropone, 1.5 g. of cycloheptylamine and 15 ml. of isopropyl alcohol is heated under reflux with stirring for 46 hours. After completion of the reaction, the reaction mixture is treated with the same procedure as in Example 14 to give 0.1 g. of the pure desired product melting at 124–126.5° C.

*Analysis.*—Calculated for $C_{23}H_{29}N_2O_3Cl$ (percent): C, 66.25; H, 7.01; N, 6.72; Cl, 8.51. Found (percent): C, 66.40; H, 6.87; N, 6.79; Cl, 8.58.

EXAMPLE 18

2-[p-(hydroxy-3-piperidinopropoxy)phenylamino]-5-chlorotropone

A mixture of 3 g. of 2-[p-(2-hydroxy-3-chloroproxy)phenylamino]-5-chlorotropone, 3 g. of piperidine and 100 ml. of anhydrous benzene is heated under reflux with stirring for 44 hours. After completion of the reaction, the reaction mixture is concentrated under reduced pressure and the residue is made acidic and shaken with benzene. The aqueous acidic solution layer is separated, made alkaline by addition of sodium carbonate and extracted with chloroform. The extract is concentrated under reduced pressure and the residue is recrystallized from a mixture of ethyl acetate and n-hexane to give 1.4 g. of the pure desired product melting at 101–101.5° C.

*Analysis.*—Calculated for $C_{21}H_{25}O_3N_2Cl$ (percent): C, 64.85; H, 6.48; N, 7.20; Cl, 9.12. Found (percent): C, 64.82; H, 6.58; N, 6.99; Cl, 8.95.

EXAMPLE 19

2-[p-(2-hydroxy-3-morpholinopropoxy)phenylamino]-5-chlorotropone

A mixture of 3 g. of 2-[p-(2-hydroxy-3-chloropropoxy) phenylamino]-5-chlorotropone, 3 g. of morpholine and 100 ml. of anhydrous toluene is heated under reflux with stirring for 20 hours. The reaction mixture is treated with the same procedure as in Example 17 and the crude crystals thus obtained are recrystallized from a mixture of ethyl acetate and n-hexane to give 1.1 g. of the pure desired product melting at 109–110°C.

*Analysis.*—Calculated for $C_{20}H_{23}O_4N_2Cl$ (percent): C, 61.45; H, 5.93; N, 717; Cl, 9.07. Found (percent): C, 6.47; H, 6.06; N, 7.18; Cl, 9.00.

EXAMPLE 20

2-[p-(2-hydroxy-3-N-benzylpiperazinopropoxy) phenylamino]-5-chlorotropone

A mixture of 3 g. of 2-[p-(2-hydroxy-3-chloropropoxy) phenylamino]-5-chlorotropone, 3.3 g. of N-benzylpiperazine and 100 ml. of anhydrous benzene is heated under reflux with stirring for 44 hours. The reaction mixture is treated with the same procedure as in Example 17 and the crude crystals thus obtained are recrystallized from a mixture of ethyl acetate and n-hexane to give 1.3 g. of the pure desired product melting at 118.5–119.5° C.

*Analysis.*—Calculated for $C_{27}H_{30}O_3N_3Cl$ (percent): C, 67.56; H, 6.30; N, 8.76; Cl, 7.39. Found (percent): C, 67.28; H, 6.34; N, 9.03; Cl, 7.40.

EXAMPLE 21

2-[p-(2-hydroxy-3-piperidinopropoxy)phenylamino] tropone

A mixture of 1 g. of 2-[p-(2-hydroxy-3-chloropropoxy)phenylamino]tropone, 1 g. of piperidine and 40 ml. of anhydrous benzene is heated under reflux with stirring for 19 hours. The reaction mixture is treated with the same procedure as in Example 17 and the crude crystals thus obtained are recrystallized from a mixture of ethyl acetate and n-hexane to give 0.6 g. of the pure desired product melting at 112–113° C.

*Analysis.*—Calculated for $C_{21}H_{26}O_3N_2$ (percent): C, 71.16; H, 7.39; N, 7.90. Found (percent): C, 71.40; H, 7.24; N, 7.68.

What is claimed is:

1. A phenylaminotropone derivative having the formula

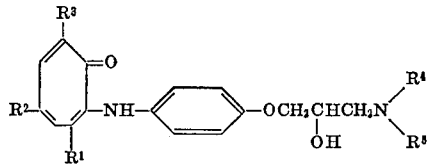

wherein $R^1$, $R^2$ and $R^3$ may be the same or different and each represents a hydrogen atom, a lower alkyl group, a halogen atom, or an amino group, $R^4$ represents a hydrogen atom or a lower alkyl group and $R^5$ represents a lower alkyl group or a cycloalkyl group and a pharmaceutically acceptable acid addition salt thereof.

2. A phenylaminotropone derivative as claimed in claim 1 wherein $R^1$ represents a hydrogen atom or a lower alkyl group, $R^2$ represents a hydrogen atom, a lower alkyl group, a halogen atom, or an amino group, $R^3$ represents a hydrogen atom or a lower alkyl group, $R^4$ represents a hydrogen atom, $R^5$ represents a lower alkyl group or a cycloalkyl group.

3. 2-[p-(2-hydroxy - 3 - tert-butylaminopropoxy)phenylamino]-5-chlorotropone.

4. 2-[p-(2-hydroxy - 3 - tert-butylaminopropoxy-phenylamino]-5-bromotropone.

5. 2-[p-(2-hydroxy - 3 - isopropylaminopropoxy)phenylamino]-5-chlorotropone.

6. 2 - [p - (2-hydroxy - 3 - cycloheptylaminopropoxy) phenylamino]-5-chlorotropone.

7. 2 - [p - (2-hydroxy - 3 - cyclohexylaminopropoxy) phenylamino]-5-chlorotropone.

References Cited

UNITED STATES PATENTS 3,501,769   3/1970   Crowther et al. ___ 260—570.7 X

ROBERT V. HINES, Primary Examiner

U.S. Cl. X.R.

260—243 B, 247.2 A, 247.5 R, 247.7 C, 268 R, 293.76, 293.83, 326.3, 326.5 M, 348 A, 348.6, 456 RA, 501.18, 501.19, 558 R, 562 R, 571, 590; 424—246, 248, 250, 267, 274, 316, 324, 330